United States Patent
Löhn et al.

(10) Patent No.: US 8,182,852 B2
(45) Date of Patent: May 22, 2012

(54) METHOD AND DEVICE FOR MULTISTAGE PRODUCT FRYING

(75) Inventors: Mirko Löhn, Koenigslutter (DE); Erik Van Loon, Nieuwendijk (NL)

(73) Assignee: BMA Nederland B.V., GV Woerden (NL)

( * ) Notice: Subject to any disclaimer, the term of this patent is extended or adjusted under 35 U.S.C. 154(b) by 449 days.

(21) Appl. No.: 12/223,509

(22) PCT Filed: Jan. 30, 2006

(86) PCT No.: PCT/NL2006/000051
§ 371 (c)(1),
(2), (4) Date: Dec. 16, 2008

(87) PCT Pub. No.: WO2007/086724
PCT Pub. Date: Aug. 2, 2007

(65) Prior Publication Data
US 2009/0304878 A1    Dec. 10, 2009

(51) Int. Cl.
*A23L 1/01* (2006.01)

(52) U.S. Cl. ........ 426/243; 426/438; 426/466; 426/523; 426/637; 99/404; 99/407; 99/443 C; 99/472

(58) Field of Classification Search .................. 426/438, 426/243, 523, 520, 637, 466; 99/404, 407, 99/443 C, 472
See application file for complete search history.

(56) References Cited

U.S. PATENT DOCUMENTS

| | | | |
|---|---|---|---|
| 3,812,775 A * | 5/1974 | Sijbring | 99/404 |
| 4,167,137 A | 9/1979 | Van Remmen | |
| 4,769,249 A | 9/1988 | Webb | |
| 4,929,461 A * | 5/1990 | Schonauer et al. | 426/438 |
| 5,997,938 A * | 12/1999 | Taylor et al. | 426/637 |
| 6,068,872 A * | 5/2000 | Hashiguchi et al. | 426/438 |
| 6,929,812 B2 | 8/2005 | Van der Doe | |
| 2004/0166210 A1* | 8/2004 | Barry et al. | 426/243 |

FOREIGN PATENT DOCUMENTS

EP    1978825 B1    10/2008
(Continued)

OTHER PUBLICATIONS

International Search Report dated Oct. 5, 2006 from corresponding International Application No. PCT/NL2006/000051.

(Continued)

*Primary Examiner* — Drew Becker
*Assistant Examiner* — Preston Smith
(74) *Attorney, Agent, or Firm* — Wolf, Greenfield & Sacks, P.C.

(57) ABSTRACT

A method is described wherein products, such as potato chips, vegetables, fruits, nuts or the like are fried in at least two stages. In the first stage the products are fried at a temperature between 90-190° C., where after the products are being transported to the second stage. In the second stage the products are subjected to frying under reduced pressure at 25-150 mbar at a temperature between 100-145° C. In the second stage evaporation is improved and maintained at a high level, because under said reduced vacuum conditions the evaporation temperature drops considerably and consequently the evaporation out of the products continues. This reduces the quantity of fatty and oily frying substance that is taken up in this stage by the product.

16 Claims, 2 Drawing Sheets

FOREIGN PATENT DOCUMENTS

| | | |
|---|---|---|
| JP | 52066654 A | 6/1977 |
| JP | 58183048 | 10/1983 |
| JP | 58183048 A | 10/1983 |
| JP | 60262558 | 12/1985 |
| JP | 2004-514465 | 5/2004 |
| JP | 2004-154106 | 6/2004 |
| WO | WO 01/91580 A1 | 12/2001 |
| WO | WO 0191580 A1 | 12/2001 |
| WO | WO 2004/075656 A3 | 9/2004 |

OTHER PUBLICATIONS

Garayo J. et al., *Vacuum Frying of Potato Chips*, Journal of Food Engineering, vol. 55, No. 2, 2002, pp. 181-191, XP002398642.

Garayo, J. et al., "Vacuum Frying of Potato Chips," *Journal of Food Engineering*, vol. 55, No. 2 (2002), 181-191.

\* cited by examiner

METHOD AND DEVICE FOR MULTISTAGE PRODUCT FRYING

The present invention relates to a multistage frying method.

The present invention also relates to a multistage frying device.

BACKGROUND

Such a method and device are known from U.S. Pat. No. 3,812,775. In the known method edible products, generally formed from compositions comprising starchy materials and containing natural and/or added sugars, are fried in a two stage frying method. During the first stage the products are fried in oil having a temperature of 110-190° C. to a moisture content of 5-20%, whereas during the second stage the products are fried under a reduced pressure of 50-100 mbar in oil at a temperature not exceeding 100° C. This prevents excessive discoloration of the fried products to occur and provides the required attractive colour to these products.

It is further known from WO-00/30472 to blanch potato strips and the like, where after the strips are fried at atmospheric pressure, cooled and fried in oil at 240-290°F. (115.5-144.4° C.) under vacuum of about 10-20 inches (25.4-50.8 mbar) of mercury.

From EP-1,283,680 a method and device are known for frying products in fat at reduced pressure. Fat is removed from the products by introducing them in a rotating chamber of a centrifuge and by centrifuging them therein at reduced pressure. The products are discharged through a bottom valve of the centrifuge and exposed to the atmosphere through a sluice chamber. An agglomeration of the products is prevented therewith.

It is an object of the present invention to further improve the known frying method, in such a way that time, cost or method savings in combination with enlarged product yield are provided by the associated device, while maintaining essential features of the fried end product, such as texture, colour, taste, aroma, oil/fat content, digestibility, and at the same time reducing thermal reaction products detrimental to humans, such as acrylamid.

SUMMARY

It is an advantage of the frying method according to the present invention that although the total frying time is dependent on in particular the cutting dimensions and the specifications of the product, the total frying time is considerably shortened due to the specified vacuum conditions and the frying temperature range in the second stage. In the second stage evaporation is improved and maintained at a high level, because under said reduced vacuum conditions the evaporation temperature drops considerably and consequently the evaporation out of the products continues. This reduces the quantity of fatty and oily frying substance that is taken up in this stage by the product, which leads to improved sensory features, such as texture and smell of the products, without an oily of fatty taste. In addition the reduced oil and fat absorption of the products is better for the health of the consumers.

Advantageously a leaching of the products to be fried, which leaching may precede the first stage in order to reduce the sugar content of the products, can be omitted completely.

For some products, such as vegetables, carrots and for example red beets, whose texture is less frying temperature dependent in the first stage, energy can be saved by frying the products in the lower part of the range of 90-190° C. under a reduced pressure of 25-700 mbar.

An embodiment of the method according to the invention has the characterising features outlined in claim 3. Advantageously keeping the measurable surface temperature of the products—also called the boundary layer temperature between said surface and the frying substance—at the input of the second stage to around 100-160° C. maintains the evaporation at the above mentioned high level also at said input at the start of the second stage.

A further embodiment of the method according to the invention has the characterising features outlined in claim 4. An the average surface temperature of around 145° C. gives the most safeguards at relatively low energy investments that evaporation is prevented to stop. This would otherwise lead to unwanted absorption of the frying substance.

If in a still further embodiment the transport time of the products, which is defined as the time from exiting the first stage to introduction into the second stage, is 15 seconds at maximum, the surface temperature of the products will not drop substantially. The transport time is an accumulation of time periods, which normally includes the time during which the products are withdrawn from the oil/fat bath in the first stage, brought to its exit, transported to the input of the second stage, introduced to in the second stage, vacuumed and subjected to hot air and/or oil in the second stage. The longer the transport time is the more this will normally affect the temperature drop and harm the texture, colour, frying substance content and aromas in the products. The transport time also depends on the frying temperature of the products in the first stage. The higher this frying temperature is the more energy is included in the products and the longer the transport time from one stage to the next may be before the surface temperature of the products will reach a critical temperature value, where under surface evaporation will stop.

Additional measures could be taken to maintain the temperature elevated above said temperature, in order to keep evaporation going on until a wanted moisture content before the start of the second stage is reached. Only at the second stage the temperature may decrease gradually as evaporation of the products is then maintained due to the reduced pressure condition in the second stage. Frying at the end of the second stage is terminated in time in order not to decrease the average moisture content of the products to a practical 1-1.5%, as in this moisture content range the formation of acrylamid more critically depends on both temperature and moisture content of the fried products.

In addition frying substance removal for avoiding a fatty taste of the end product may be effected in ways.

BRIEF DESCRIPTION OF THE DRAWINGS

At present the method and device according to the invention will be elucidated further together with their additional advantages, while reference is being made to the appended drawing, wherein similar components are being referred to by means of the same reference numerals. In the drawings.

DETAILED DESCRIPTION

Figure 1:
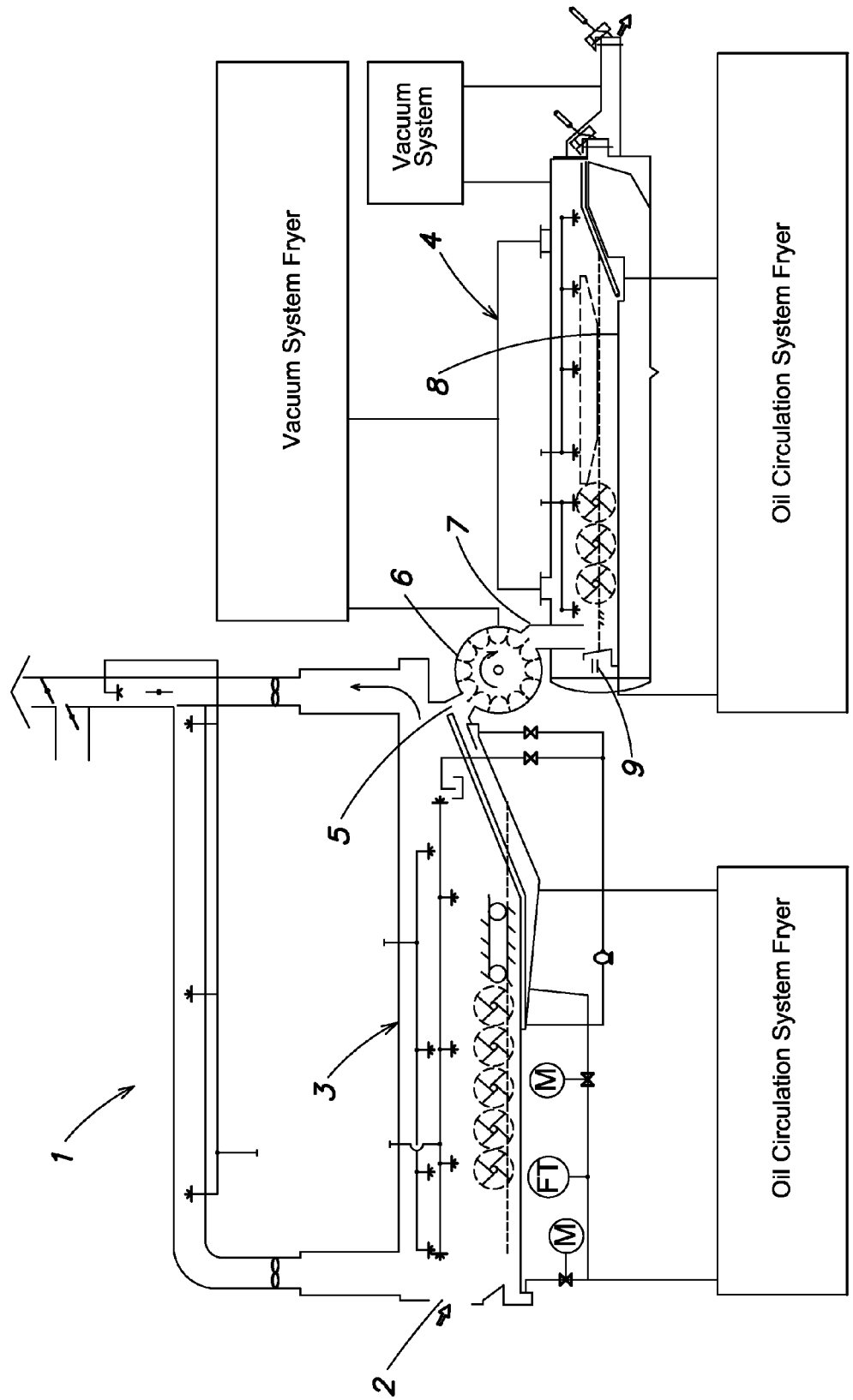
FIG. 1 shows a general outline of a multistage frying device according to the invention, which is capable of performing the method according to the invention.

FIG. 1 shows a device 1 for frying products in several distinct stages. The selected and collected raw materials for the products, which may for example be potatoes, vegetables, nuts, fruits or compositions or formulations of these products are prepared before being introduced in the device where the products are subjected to the multistage frying method. Generally the products will contain carbohydrates, that is starch and sugars. In the remainder of this description only reference will be made to potatoes, in particular potato chips, as a simplified example of the aforementioned products. The raw materials are prepared by being washed, whereby foreign elements such as sand and stones and the like are removed. The potatoes are sometimes peeled e.g. by means of steam or by means of mechanical peeling systems, and the peels are removed. Thereafter the potatoes are washed for the removal of peel rests and surface starch, and cut into forms or slices, and then possibly washed again to remove free starch from the cutting process.

Possibly a blanching of the cut products may be required in order to leach sugars out of the products, in particular if it concerns products having a high sugar content. The leaching is then required, because sugars and proteins are known to attribute to the well known Maillard reaction complex causing an unwanted brown discoloration as well as the formation of thermal reaction products like acrylamid. The sugar content depends on the type of raw materials available, but also depends on the season of the year. An important step forward, both in costs per product, handling time, seasonal dependence and final product yield would be if the leaching could be made totally superfluous. The present multistage frying process is capable of preventing a leaching of the products, even if the raw materials of the products have a high sugar content. The frying parameters determining the conditions in the second stage, which will be described after the description of the first stage which follows first, hold important features for achieving that goal.

Subsequent to the aforementioned preparation the cut products are brought to an input 2 of the device 1. The device as shown comprises two main stages and possible in between stages, such as a frying substance removing, or evaporation continuation stage, but in practise more than two main stages may be feasible and advisable, depending for example on the kind of products to be fried. The device 1 as shown comprises two separate housings 3 and 4 for each of the main stages, whereby the housing of the first stage is positioned above the housing of the second stage. In the first stage of the main stages the input products are fried generally, but not necessarily, under atmospheric conditions, to give the products their wanted consistency, crispyness or crunchyness, main texture and main colour. This may require common components such as for example known per se from U.S. Pat. No. 3,812,775, EP-1,133,243 or EP-1,283,680, whose relevant contents are incorporated here by reference thereto.

The frying temperature in the first stage may go down to 90° C., but then frying will take place under vacuum conditions in order to effect useful frying. In the lower frying temperature range it will however take more time for the products to be fried. Products that may be fried at such low temperatures are vegetables, carrots and for example red beets.

In a continuous or batch like process the products input in the first housing 3 are fried under atmospheric conditions in a usually oil and/or fat containing frying substance, generally having a temperature of between 90-190° C., preferably around 185° C. The higher this temperature the more energy the products will contain—given the time of stay—if they leave the housing 3 of the first stage through output 5.

Figure 2:
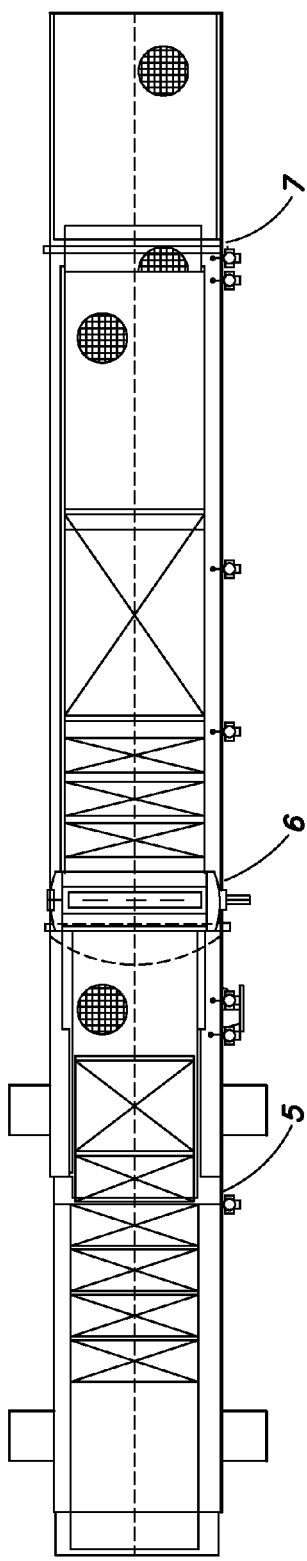
FIG. 2 shows subsequent broadening paths for the products to be fried.

As shown by way of example in more detail in FIG. 2 also, the output 5 is coupled through an operable sluice 6 to an input 7 of the second stage housed in the second housing 4. Preferably an output, such as output 5 of the first stage has a smaller width than the width of a subsequent input, such as for example the input 7 of the second stage, which has a width of eventually 1800 mm. The widening of the various subsequent paths, through various outputs and wider inputs prevents the aggregation and coagulation of the products. Practical examples of successive width shown in FIG. 2 of input, sluice and output range stepwise for example from 1400 mm, 1500 mm, 1600 mm to 1800 mm. The housing 4 of the second stage has an interior portion 8 which is mobile by means of a schematically shown rail system 9. By being positioned under the housing 3 of the first stage a compact frying device 1 results, whereby furthermore the rail system 9 allows an easy cleaning, hoisting and maintenance of the components used in the second stage.

The frying in the first stage is terminated at an average moisture content of the products of 5-30% by weight, preferably 8-15% by weight, depending on the products. After possible direct transport and introduction through input 7 to the second stage the products are subjected to a frying under reduced pressure at 25-150 mbar, preferably 50-100 mbar, in particular around 75 mbar, at a temperature between 100-145° C. This pressure is so low that the evaporation of water vapour out of the products will be boosted but never be interrupted. This safeguards that a minimum of frying substance will break in through the surface of the products and affect the internal texture of the product material, taste, appearance, aroma and structure of the products.

At the other hand the second stage frying temperature range is rather high compared to the second stage temperature below 100° C. advised in U.S. Pat. No. 3,812,775, which results in a considerable shorter frying time, an associated higher product yield, and which has advantages in relation to the organoleptic standards.

Figure 3:
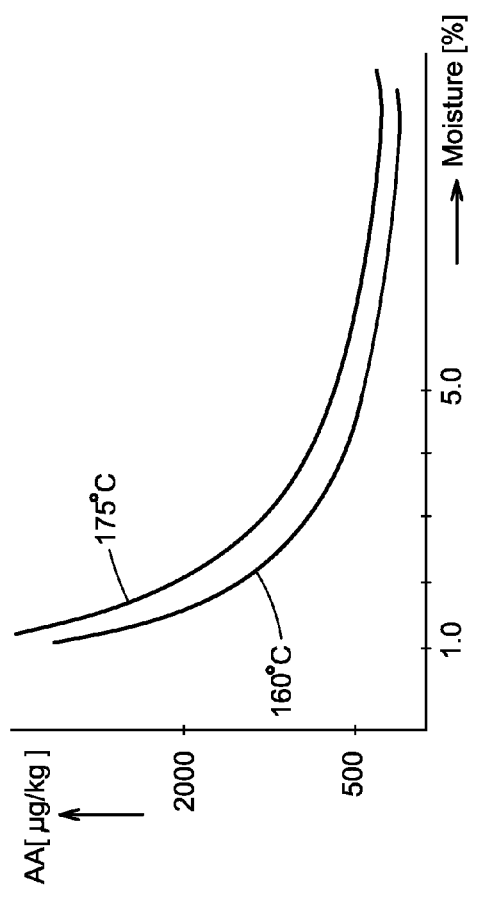
FIG. 3 shows a graph of the forming under atmospheric conditions of acrylamid (AA) as a function of the moisture percentage in fried products, in dependence on several frying temperatures meant to elucidate the acrylamid forming process during frying.

The graph of FIG. 3 shows the forming of acrylamid (AA) as a function of the moisture content of the products for varies frying substance temperatures. It is known per se that the amino acid asparagine and reduced sugars both generally present in the products to be fried form acrylamid under the influence of thermal energy. The graph provides the inside that temperature control at higher moisture contents of the product is less critical with regard to acrylamid formation than at lower moisture contents. It also shows that the measuring of moisture output is more critical at lower moisture contents, when it comes to acrylamid formation at a given second stage temperature. It further shows that a reduction of the frying temperature at the second stage or possibly at the end of the second stage or in a further third stage thereafter, reduces the acrylamid formation, in particular at lower moisture contents. Therefore the temperature of the frying substance at the end of the second stage or possibly thereafter in a third stage where the product is also kept under vacuum conditions, is preferably set lower than at the beginning of the second stage. This temperature drop is meant to coop with the problem of an increased acrylamid formation at low moisture contents of the products at the end of the second stage as the graph shows. This way the moisture content of the fried products can be lowered to lie within the above specified ranges, without the danger of creating detrimental frying or side products which affect the essential features of the products, or endanger human health. The second stage frying method can be controlled by appropriate means according to the above teachings for achieving the advantages set out above.

The surface temperature of the products entering the input of the second stage is between 100-160° C. In practise a temperature of around 145° C. is maintained there between. If however the stay time between the stages is too long and no measures are taken to prevent the products from cooling too much then the transport time of the products, which is defined as the time from exiting the first stage to introduction into the second stage, should be 15 seconds at maximum. Otherwise the cooling of the products in between the stages could result in the unwanted stopping of evaporation out of the product. Under circumstances the products are allowed to cool in the second stage to approximately 130° C., while the reduced pressure condition is created.

The reduced pressure frying in the second stage is terminated if an average moisture content of between 0,5-3.5%, particularly 0.8-2%, more particularly around 1.5% by weight is reached. The end result of the frying method is in particular a potato product having improved sensory features comparable with classical potato chips fried under atmospheric pressure in a single stage process.

The wanted continuation of evaporation of the products between and during any of the stages can be achieved by execution of one or more of the following evaporation continuation steps: a) flowing hot possibly superheated frying vapours of around 105-145° C. over and/or through the products; b) using electromagnetic wave radiating elements, such as infrared elements or microwave elements for irradiating the products; c) spraying of a hot enough frying substance of around 100-145° C. over the products; d) injection of a hot enough frying substance of around 100-145° C. onto the possibly moving products; e) vacuuming the possibly moving products; f) conveying hot air of around 105-145° C. over and/or through the products. Use can be made of appropriate heat exchangers too for heating, superheating or reheating the frying substance. At least one of the evaporation continuation steps can at wish be executed under a reduced pressure, which has the effect of reducing the required temperature at which evaporation out of the products takes place. Appropriate means may further be present to remove frying substance from the products, either under atmospheric, or under reduced pressure conditions.

Finally in particular, but not exclusively at the last stage the removal of the frying substance from the products may at wish be executed by means of one or more of the following steps: a) prolonging the drain or stand still time of the products for allowing the products to drip out, without the supply of mechanical energy being required; b) forcing the products to vibrate, which is also meant to loosen the products from one another; c) centrifuging the products; d) sucking out the frying vapours; e) drawing, either forced or unforced, steam in particular overheated steam possibly created through an overheating of frying vapours, over and/or through the products.

It is advantage if one or more vacuum control devices are installed in the device 1 and controlled to reduce the pressure within ±5 mbar, in particular ±2 mbar. This is important because the boundaries of the pressure control range are of vital importance for achieving uniformity of the key attractive features of the products such as in particular taste, aroma, appearance, and a crispy texture of the fried potato chips or similar products.

For a smooth, stationary accurate temperature control in the various stages of the frying process it is advisable to keep the amount of water per time unit included in the input products as constant as possible.

The invention claimed is:

1. A method for frying products in at least two stages, comprising:
    frying the products at a first stage at a temperature between approximately 90-190° C.;
    thereafter transporting the products to a second stage from an output of the first stage to an input of the second stage, the input being wider than the output; and
    thereafter, frying the products at the second stage under a reduced pressure of approximately 25-150 mbar at a temperature between 100-145° C.;
    wherein the products are transported through the stages along a path that successively increases in width, such that the products move in succession along the path without aggregating.

2. The method of claim 1, wherein frying the products at the first stage comprises frying the products under a reduced pressure of approximately 25-700 mbar.

3. The method of claim 1, wherein an average surface temperature of the products is between approximately 100-160° C. when frying the products at the second stage begins 4. The method of claim 1, wherein a surface temperature of the products is maintained at an average temperature of approximately 145° C. during transporting the products to the second stage.

5. The method of claim 1, wherein a transport time of the products, which is defined as a time elapsed between a termination of frying the products at the first stage and a beginning of frying the products at the second stage, is less than or approximately equal to 15 seconds.

6. The method of claim 1, wherein frying the products at the first stage is terminated when an average moisture content of the products is approximately 5-30% by weight.

7. The method of claim 1, further comprising treating the products after a termination of frying in the first stage such that evaporation out of the products continues during transporting the products to the second stage.

8. The method of claim 1, wherein frying the products at the first stage comprises frying the products at a temperature of approximately 185° C. until the products reach an average moisture content of approximately 8-15% by weight, for products containing carbohydrates and/or protein; and/or wherein frying the products at the second stage comprises frying the products under a pressure of approximately 50-100 mbar until the products reach an average moisture content of between approximately 0.5-3.5% by weight.

9. The method of claim 1, wherein an average frying temperature during frying the products at the second stage is approximately 130° C.

10. The method of claim 1, wherein a temperature of a frying substance in the second stage at a termination of frying the products at the second stage is lower than a temperature of the frying substance at a beginning of frying the products at the second stage, in dependence on the moisture content of the products at the end of the second stage.

11. The method of claim 1, wherein transporting the products to the second stage comprises at least one of a following evaporation continuation steps:

a) flowing hot frying vapors having a temperature of approximately 105-145° C. over and/or through the products;
b) irradiating the products using electro-magnetic wave radiating elements;
c) spraying a hot frying substance having a temperature of approximately 100-160° C. over the products;
d) injecting a hot frying substance having a temperature of approximately 100-160° C. onto the products;
e) vacuuming the products; and
f) conveying hot air having a temperature of approximately 105-145° C. over and/or through the products.

12. The method of claim 11, wherein at least one of the flowing, irradiating, spraying, injecting, vacuuming or conveying steps is executed under a reduced pressure.

13. The method of claim 1, further comprising, after frying the products at the second stage, removing a frying substance from the products under atmospheric, or under reduced pressure conditions.

14. The method of claim 13, wherein removing a frying substance from the products comprises at least one of:

a) prolonging a drain time of the products;
b) vibrating the products;
c) centrifuging the products;
d) sucking frying vapors out of the products; and
e) drawing steam over and/or through the products.

15. The method of claim 1, wherein a frying substance of the first stage and/or a frying substance of the second stage comprises oil and/or fat.

16. The method of claim 1, further comprising controlling a pressure to within ±5 mbar during frying the products at the second stage.

* * * * *